United States Patent [19]
Grungras

[11] 3,889,331
[45] June 17, 1975

[54] MACHINE TOOL BIT AND HOLDER

[76] Inventor: Josef David Grungras, 726 Gerald Ct., Brooklyn, N.Y. 11235

[22] Filed: Oct. 9, 1974

[21] Appl. No.: 513,455

Related U.S. Application Data
[63] Continuation-in-part of Ser. No. 311,429, Dec. 1, 1972, abandoned.

[52] U.S. Cl. ................................................. 29/96
[51] Int. Cl. ............................................ B26d 1/00
[58] Field of Search ................................. 29/95, 96

[56] References Cited
UNITED STATES PATENTS

| | | | |
|---|---|---|---|
| 398,918 | 3/1889 | Whafley | 29/96 |
| 1,361,851 | 12/1920 | Hall | 29/96 |
| 2,537,837 | 1/1951 | Labrozzi | 29/96 |
| 2,675,604 | 4/1954 | Plummer | 29/96 |
| 3,060,554 | 10/1962 | Kirchner | 29/96 |
| 3,323,192 | 6/1967 | Gustafson | 29/96 |

FOREIGN PATENTS OR APPLICATIONS

| | | | |
|---|---|---|---|
| 1,060,906 | 8/1967 | United Kingdom | 29/96 |
| 979,664 | 1/1965 | United Kingdom | 29/96 |
| 247,958 | 8/1926 | United Kingdom | 29/96 |
| 449,557 | 9/1927 | Germany | 29/95 |
| 351,406 | 7/1905 | France | 29/96 |
| 209,667 | 6/1960 | Austria | 29/96 |

*Primary Examiner*—Harrison L. Hinson
*Attorney, Agent, or Firm*—Charles E. Baxley, Esq.

[57] ABSTRACT

A longitudinally extending tool bit includes a longitudinally extending trapezium-shaped clamping section laterally cojoined with a longitudinally extending trapezium-shaped cutting section which includes a cutting edge. The two sections form a tool bit having a substantially uniform cross section that is generally "Bow Tie" shaped. The clamping and cutting sections are juxtaposed and configured in a manner that the resultant of axial advancing forces and turning forces received by the cutting edge of the cutting section are conveyed to the tool bit holder per normally organized abutment of the lower wall of the cutting section onto the tool bit holder. The cutting section is configured to include predetermined preformed side clearance and predetermined preformed side rake for the entire longitudinal extent of the tool bit. Tool bit holders are provided which include trapezium-shaped clamping surfaces for engagement with the clamping section of the tool bit to provide support therefor.

5 Claims, 11 Drawing Figures

FIG. 1.
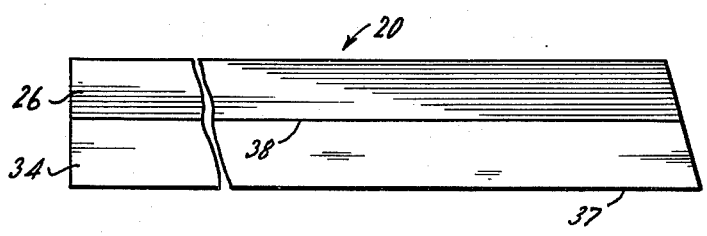
FIG. 2.
FIG. 3.
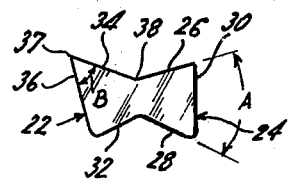
FIG. 4.
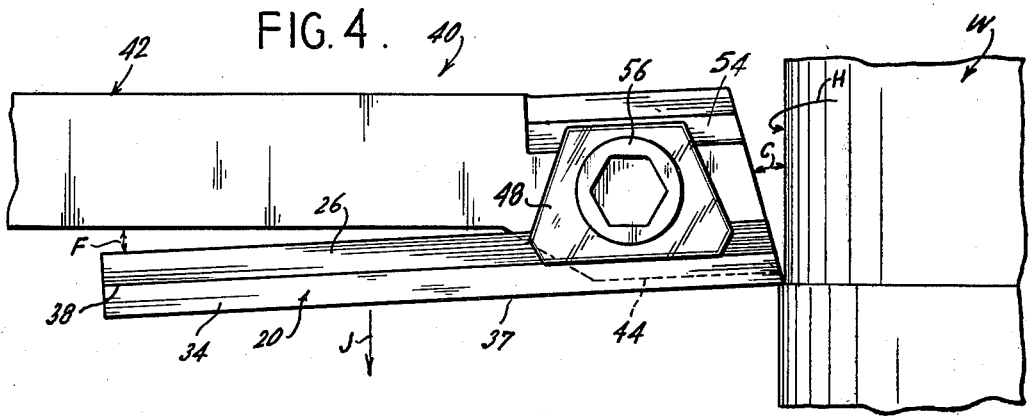
FIG. 5.
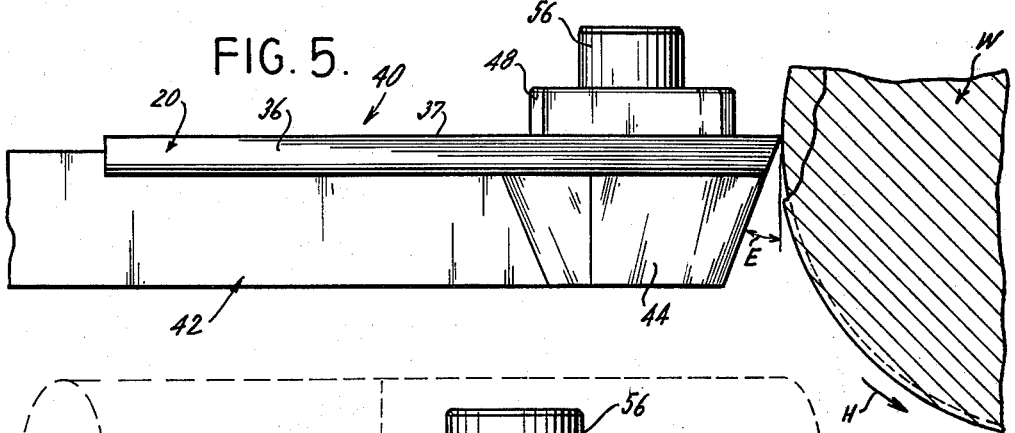
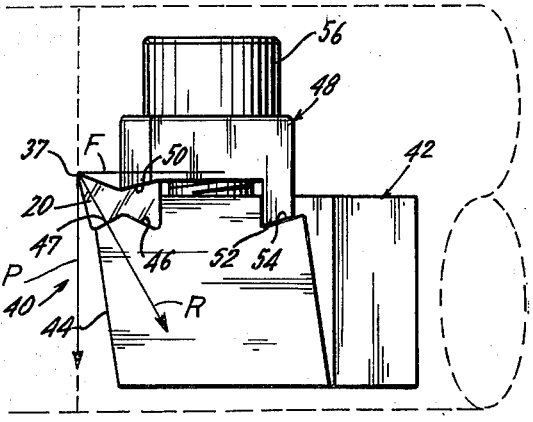
FIG. 6

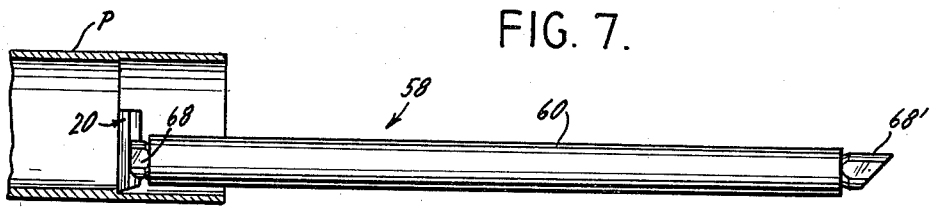
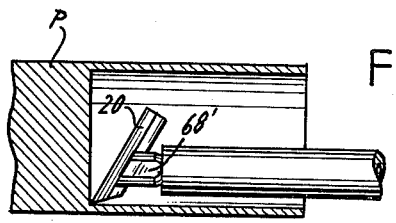
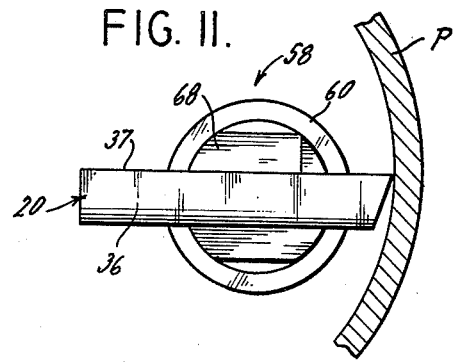
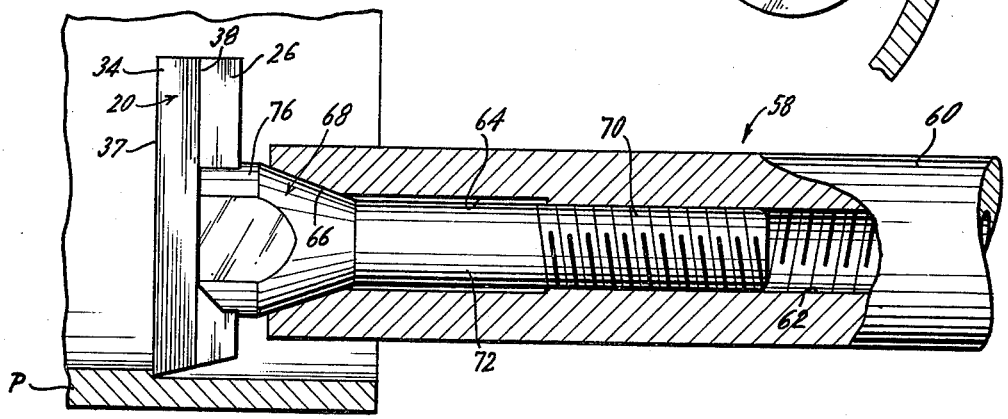
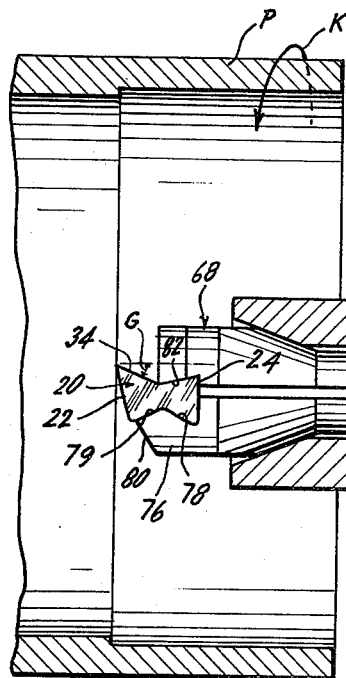
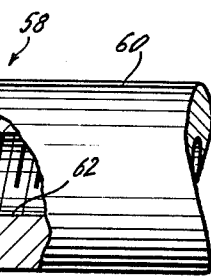

MACHINE TOOL BIT AND HOLDER

CROSS REFERENCE

This a continuation-in-part application with respect to my copending application No. 311,429 filed Dec. 1, 1972, now abandoned.

BACKGROUND OF INVENTION

The present invention relates generally to cutting tools and in particular to tool bits for use in tool holders designed particularly for holding and supporting the tool bits.

Cutting tools of various types including tool bits and holders therefor have been available to amateur and professional machinists for use with lathes of various sizes as well as with milling machines and other wood and metal machining devices. The standard tool bit used in most cutting machines is formed of a large piece of expensive high-speed steel consituted to retain its hardness even under the high heat developed during many machining operations. The requirements of very high speed machining necessitate the use of extremely expensive tool bits to withstand the extremely high heat built up during the machining. One of the best materials for tool bits is carbide as this material retains hardness under even very high temperature conditions while maintaining a good cutting edge. However, despite its desirable characteristics, the prohibitively high cost of carbide often prevents its use in tool bits.

Of recent times, tool bits have been made in reduced size of expensive high speed steel. Special tool bit holders have been designed to permit the mounting of the reduced size tool bits during the cutting operation.

Although the use of small tool bits has enabled relatively high cost material to be used for the bit itself, it has not eliminated the difficult task of sharpening the tool bit and grinding the proper clearances and rakes thereon in order to permit proper application of the sharpened tool bit edge to the work surface. The use of relatively small tool bits has resulted in the requirement that backing plates be used in an attempt at preventing breakage of the small bits.

STATEMENT OF INVENTION

It is an object of the present invention to provide a cutting tool useful in machining which is inexpensive to produce easily resharpened by even an inexperienced machinist and which does not easily break.

It is a more particular object of the present invention to provide a machine tool bit and holder which, in combination, is inexpensive to produce using even expensive tool bit materials. Advantageously, the tool bit of the present invention may be formed by a variety of methods of a variety of materials and the tool bit and holder which results is a superior tool which is less expensive and easier to use than cutting tools presently available.

In accordance with an illustrative embodiment demonstrating objections and features of the present invention, there is provided a tool bit for use in a cutting tool. The tool bit comprises a longitudinally extending cutting section which is laterally co-joined with a longitudinally extending clamping section. The cutting section has a side wall and a top wall and the side and top walls of the cutting section are constructed and arranged to intersect to form a longitudinally extending cutting edge at their intersection. The cutting section side wall is disposed with respect to the cutting section top wall to provide predetermined side clearance and predetermined side rake for the cutting edge when the tool bit is applied to a work piece. The clamping section has a top wall which is constructed and arranged with respect to the cutting section top wall so as to longitudinally intersect the cutting section top wall. A chipbreaker groove is formed along the top of the tool bit by the intersection of the top walls.

The cutting section side and top walls noted above are constructed and arranged with respect to the tool bit to direct forces on the cutting section toward the clamping section. A tool holder is provided for clamping the clamping section of the tool bit and for concurrently providing support for the cutting section on the side thereof opposite the cutting edge.

BRIEF DESCRIPTION OF DRAWINGS

The above brief description as well as further objects, features and advantages of the present invention will be more fully understood by reference to the following detailed description of the presently preferred but nonetheless illustrative embodiments in accordance with the present invention, when taken in conjunction with the accompanying drawing, wherein:

FIG. 1 is an enlarged plan view of a representative tool bit of the present invention;

FIG. 2 is a front elevation view of the tool bit shown in FIG. 1;

FIG. 3 is a right end elevation of the tool bit shown in FIG. 2;

FIG. 4 is an enlarged fragmentary plan view of a tool bit holder of the present invention showing a tool bit of the present invention clamped in place therein with the tool bit being applied against a work piece;

FIG. 5 is a front elevation view of the tool bit holder and work piece of FIG. 4 with the work piece partially in section and partially broken away;

FIG. 6 is a right end view of the tool bit and holder of FIG. 5;

FIG. 7 is a fragmentary plan view of a boring bar of the present invention showing a tool bit of the present invention clamped in one end thereof with the tool bit being applied to a work piece.

FIG. 8 is a fragmentary plan view of the boring bar of FIG. 7 showing a tool bit of the present invention clamped in the opposite end thereof being applied to a work piece;

FIG. 9 is an enlarged detail plan view of the boring bar and tool bit shown in FIG. 7, partially broken away to show the internal constructional details of the boring bar;

FIG. 10 is a front elevation view of the boring bar and tool bit shown in FIG. 9; and, FIG. 11 is a left end view of the boring bar shown in FIG. 10.

DESCRIPTION OF PREFERRED EMBODIMENTS

Referring now specifically to the drawing and first to FIGS. 1, 2 and 3, there is shown an illustrative tool bit embodying features of the present invention, generally designated by the reference numeral 20 which includes a longitudinally extending trapezium-shaped cutting section 22 on the left as seen in FIG. 3 and a longitudinally extending trapezium-shaped clamping section 24 on the right as seen in FIG. 3, laterally co-joined to form the integral tool bit 20.

The tool bit 20, which may be formed by any one of a number of methods such as sintering, die-stamping or extrusion, exhibits a substantially constant cross section for its entire length. Though FIG. 3 shows a right end view of the tool bit 20, the end view is substantially the same as a typical cross section.

The clamping section 24 includes upper and lower clamping walls or surfaces 26, 28 as well as a right bearing wall or surface 30. The manner in which the clamping section 24 of the tool bit 20 is clamped for positioning relative to a work piece W will be described in detail hereinafter. While the invention contemplates any angular relationship between the upper and lower clamping surfaces 26, 28 which may be convenient, it has been found that if the angle A included therebetween equals 55 degrees, the most secure clamping of the clamping section 24 is experienced.

The cutting section 22 includes a lower bearing wall or surface 32, and top and side walls or surfaces 34, 36. The top and side surfaces 34, 36 intersect internally at an angle of keenness B. The outer intersection of the top and side surfaces 34, 36 forms a cutting edge 37. The upper clamping surface 26 and the top surface 34 intersect to form a chipbreaker groove 38 which serves to prevent the formation of continuous chips of material being removed by the tool bit 20. While the angle of keenness B is preformed by virtue of the angular relationship between the top surface 34 and the side surface 36, the angle of keenness may be readily changed by the user of the tool bit in a manner to be described.

If, for example, a very sharp cutting edge 37 is desired for a rough cut, the angle of keenness B is decreased by properly grinding away a small part of the end of either the top surface 34 or the side surface 36. In addition, the angle of keenness B may be substantially increased, and the tool bit dulled for use in some finishing cuts, in a similar manner by removing or "dulling" a part of the edge 37.

A tool bit holder 40 shown in FIGS. 4, 5 and 6, designed for rigid support in a tool post of a lathe or the like, includes a main body 42 and a laterally extending projection 44. The tool bit holder 40 may be formed in any conventional manner such as by die stamping or the like. If the tool bit holder 40 is formed by die stamping, the laterally extending projection 44 has a clamping surface groove 46 and a bearing surface support groove 47 formed therein by a process such as milling or the like. The grooves 46, 47 are configured to respectively receive the lower clamping surface 28 and a portion of the lower bearing surface 32 of the tool bit 20, in a manner to be more fully explained hereinafter.

A clamp 48 includes a clamping surface 50 angled to mate with the upper clamping surface 26 of the tool bit 20. The clamp 48 also includes a downwardly projecting flange 52 which mates with a corresponding groove 54 in the laterally extending projection 44 of the tool bit holder 40 which prevents lateral movement of the clamp with respect to the tool bit holder 40. A set screw 56 passes through an opening drilled in the clamp 48 and mates with a tapped opening in the projection 44. When the set screw 56 is tightened the tool bit 20 is firmly clamped within the tool bit holder 40.

The tool bit 20 and the tool bit holder 40 are so designed and configured that the tool bit is supported, in part, by the groove 47 for virtually its entire supported length on the lower bearing surface 32 which is located transversely opposite the cutting edge 37. As will be described in more detail hereinafter, this manner of support greatly reduces tool chatter and breakage of the tool bit 20.

FIGS. 7 through 11 show a boring bar 58 which is to be clamped in a tool post (not shown) for use in boring a hole in a work piece P on a lathe or like machine. The boring bar 58 includes a main body 60 which has a longitudinally extending opening 62 therethrough which is threaded for most of its length. The opening 62 terminates at both ends of the boring bar 58 in an unthreaded coaxial cylindrical section 64. Each section 64, in turn, terminates in a frusto-conical unthreaded outer section 66 which opens through each end of the boring bar 58.

A collet 68, best seen in FIGS. 9 and 10, includes a threaded male section 70 which is sized and threaded to mate with the threaded opening 62 in the boring bar 68. A non-threaded cylindrical section 72 of the collet 68 is joined on one end to the threaded male section 70 and on the other end to a frusto-conical section 74. The frusto-conical section 74 is attached to a clamping segment 76.

The clamping segment 76 includes a transversely extending groove 78 shaped to support the lower clamping surface 28 of a tool bit 20 inserted therein. A second groove 79, configured and arranged to mate with the lower bearing surface 32 of the tool bit 20, appears within an axially extending projection 80 from the collet 68. The groove 79 underlies and supports the lower bearing surface 32 of the tool bit in much the same manner as does the groove 47 of the tool bit holder 40. The grooves 78, 79 are perpendicular to the longitudinal axis of the collet 68.

The clamping segment 76 of the collet 68 also includes an upper clamping surface 82 which bears against and clamps the upper clamping surface 26 of the tool bit 20. The clamping of the tool bit 20 occurs as the collet 68 is drawn into the boring bar 58 by turning of the collet and engagement of the thread of section 70 with the threads of the opening 62. As the collet 68 is drawn into the boring bar 58, the frusto-conical surface 66 of the boring bar cams against the frusto-conical surface 74 of the collet, thus compressing the clamping segment 76 of the collet 68. This compressive force operates to narrow the partially axially extending slit 82 thereby translating the compressive force into clamping force.

At the end of the boring bar 58 opposite the end carrying the collet 68, the boring bar includes a collet 68' (shown in FIGS. 7 and 8). The collet 68' is substantially a duplicate of the collet 68 with the exception that the grooves therein (not shown) which correspond to the grooves 78 and 79 of collet 68 are disposed at an angle of 45° with respect to the longitudinal axis of the collet 68'. As may be noted from reference to FIG. 8, due to the aforementioned orientation of the grooves, the collet 68' holds an inserted section of tool bit 20 in much the same manner as dies the collet 68 though at a different angle. The collet 68' likewise includes a projection 80 (not shown) which carries a groove similar to groove 79 and also used for support of the lower bearing surface 32 of a tool bit 20. The function of the angled collet 68' shall be described in detail hereinafter.

While the operation of the tool bits and tool bit holders described herein are discussed with respect to turning operations most commonly carried out on a lathe, it is to be understood that the tool bits and holders of the present invention are equally applicable to other machining operations and apparatus including, without limitation, milling machines, fly cutters and the like including wood-working operations.

In all machining operations, the cutting tool bit must have sufficient clearance between the tool bit and the work to permit the tool bit to advance into the work without rubbing. In a lathe or other turning machine, the work piece is rotated and the cutting tool bit is fixed a predetermined radial distance into the work. The tool bit is then moved axially along the work to shear material and reduce the axial dimension of the work piece. To permit this type of cutting, both end and side clearances are required on the tool bit.

The tool bit holder 40 and the clamped tool bit 20 of the present invention cooperate in a manner as shown in FIGS. 4 through 6, so that the proper clearances are established for a normal turning operation when the tool bit holder is fixed perpendicular to the turning axis of a work piece W.

The tool bit 20 is shown in FIG. 4 as pre-ground with a side clearance C when the tool bit holder 40 is arranged as described hereinbefore. FIG. 5 shows the tool bit 20 with the proper end clearance E. Naturally, other side and end clearances are possible and side and end clearances may be easily changed by even an inexperienced machinist by merely touching the end of the tool bit 20 to a grinding wheel to grind the specific side and end clearances desired.

In addition to side and end clearances, for most cutting operations, a cutting tool must have a side rake angle which is defined as the angle of slope across the top of the cutting tool and which gives the cutting tool its shearing action. In addition, there is another rake angle which is required for proper operation of a cutting tool bit, namely back rake, which directs chips of removed material away from the work.

Unlike side and end clearances which are relatively easy to grind on a cutting tool, side and back rake angles are more difficult and time consuming to produce properly, particularly by the inexperienced machinist. Naturally, with the ordinary tool bit, side and back rakes must be re-ground every time the tool bit requires re-sharpening. Often, even when properly done, this involves removal of substantial amounts of expensive tool bit material.

In the cutting tool bit 20 and tool bit holders 40, 58 of the present invention, the relationship between the configuration of the tool bit and the tool bit holder provides for predetermined rake angles when the tool bit holder is arranged perpendicularly relative to the axis of rotation of the work pieces W and P as shown in FIGS. 4, 5 and 8 through 11. The predetermined position of the tool bit 20 with respect to the tool bit holder 40 (which results from the angled nature of the milled grooves 46, 47 with respect to the main body 42 of the tool bit holder 40), provides the predetermined back rake F shown in FIG. 4. Naturally, the back rake F can be varied if desired, by varying the angular relationship between the tool bit holder 40 and the work piece W.

FIG. 10 which shows the boring bar 58, (the operation of which will be described in greater detail hereinafter) clearly illustrates the side rake G, so vital to proper cutting tool performance. In the present invention side rake G is predetermined by virtue of the relationship between a work piece and the top surface 34 of tool bit 20 when the bit is clamped in a properly positioned tool bit holder. In the case of the boring bar 58, proper position is achieved when the boring bar is axially aligned with the work piece P.

As will be noted by reference to FIG. 1, the surface 34 extends longitudinally for the entire extent of the tool bit 20. Consequently, the predetermined side rake G, determined by surface 34, need not be re-ground each time the tool bit is sharpened. Thus, the present invention provides great accuracy and great efficiency in use of the combination of the tool bit and tool bit holder over those previously available. If it is desired to work with other than the predetermined side rake angle G provided, touching a small length of the surface 34 to a grinding wheel will produce the desired side rake while removing a minimum of expensive tool bit material.

In operation, a typical use for the combination of the tool bit 20 and tool bit holder 40 (FIGS. 4 through 6) is to reduce the outside diameter of the work piece W. The work piece W is caused to rotate by a lathe or the like, in the direction shown by the arrow H. The tool bit 20 is inserted within the tool bit holder 40 after the proper clearance angles C, E (see FIGS. 4 and 5) are ground thereon and the tool bit is clamped so as to protrude past the end of the tool bit holder a distance to permit proper chip formation and removal, for example, 1/16 of an inch.

The tool bit holder 40 is clamped in a tool post (not shown) which is then set to bring the cutting edge 37 of the tool bit 20 a desired radial distance away from the center of rotation of the work piece W. The value of the radial distance decided upon determinates the amount of material to be removed with the cut. Once the radial distance is set and the work piece W is rotating, the tool bit holder 40 is moved axially with respect to the work piece W in the direction indicated by the arrow J in FIG. 4 and the desired amount of material is removed from the work piece. Upon completion of the pass just described, the tool bit holder 40 is moved back to its initial position with respect to the work piece W, advanced radially toward the center of rotation of the work piece and the process is repeated until the desired size and/or finish of the work piece is obtained. FIG. 6 shows the axial advancing force (directional arrow F) and the turning force (directional arrow T) coacting to produce a resultant (directional arrow R) which is perpendicular to the surface 32 of the bit and the surface 47 of the tool bit holder 40.

When a relatively small diameter opening is desired in a work piece P (see FIGS. 7 through 11), the tool bit holder 40 is unsuitable as it requires a much greater amount of space than is available. In such a situation, the boring bar 58 shown in FIGS. 7 through 11 is used. Generally, the initial cut is made by placing a section of the tool bit 20 in the collet 68' (which is angled at 45° to the axis of the boring bar). The section of tool bit 20 which is placed in the collet 68' must, of necessity, be of lesser length than the size of the opening desired. The details of the method of insertion and support of the tool bit 20 are most clearly seen with reference to the collet 68 seen in FIGS. 9 through 11 which shows virtually the same arrangement of components and which is used if a square inside corner is desired for the opening formed.

With the collet 68, the section of tool bit 20 is placed into the collet with the tool clamping section 24 (see FIG. 10) within the collet clamping segment 76. The lower clamping surface 28 and the lower bearing surface 32 of the tool bit 20 are supported by the grooves 78, 79 respectively, of the collet clamping segment. The collet 68 is then turned to advance the threaded section 70 thereof into the threaded opening 62 of the boring bar 58 with the frusto-conical section 66 of the boring bar 58 camming the frusto-conical section 74 of the collet, thereby rigidly clamping the tool bit within the boring bar.

Due to the general similarity between the method of operation of the removal process with either a boring bar 58 or a tool bit holder 40, a detailed description of the operation of the boring bar is not required. It will be appreciated, however, that the combination of the tool bit 20 and the boring bar 58 possesses the same advantages possessed by the combination of the tool bit 20 and the tool bit holder 40.

While the section of the tool bit 20 shown contained within the collets 68, 68' has been illustrated in the drawing herein for the sake of clarity as extending radially beyond the boring bar 58 on the non-cutting side thereof, it is to be understood that the section of the tool bit 20 need not extend at all beyond the non-cutting side of the boring bar. Instead, the radially outermost portion of the tool bit 20 need extend only 1/16 of an inch radially beyond the axis of the boring bar. This permits the use of the boring bar 58 for the production of openings which are only ⅛ of an inch greater in diameter than the boring bar diameter. Thus, it is possible to use the tool bit and boring bar tool holder of the present invention for the accurate development of openings heretobefore producable only with relatively inaccurate drills and reams.

During the machining operations described above, the tool bit 20 is bound to dull, due to wear and heat developed during the machining operations. To-resharpen the tool bit 20, it is only necessary to remove the tool bit holder from the tool post, touch the end surface of the tool bit to a grinding wheel to renew the angle of keenness B and advance the tool bit toward the work piece.

If the predetermined side rake angle G (see FIG. 10) has been used, it will not be necessary to regrind this angle as the top surface 34 of the tool bit 20 provides this standard side rake angle for the entire longitudinal extent of the tool bit. As noted above, if a side rake angle G is desired which is different from the predetermined side rake angle, only a slight amount of material need be removed from the tool bit 20 to provide the desired side rake. Also, as noted above, the chipbreaker groove 38 need not be re-ground each time the tool bit 20 is re-sharpened thus saving considerable time and material.

Due to the necessity for removing only relatively small amounts of material from the tool bit to either sharpen or provide the desired rake angles and/or clearances, and due to the small size of the entire tool bit, the tool bit of the subject invention may be economically produced from even relatively expensive materials, such as carbide, for relatively little cost. Further, the uniform cross section of the tool bit 20 permits manufacture thereof by many different processes including the extremely economical process of extrusion.

When the tool bit 20 is in use removing material from the work piece, the resolution of the forces (see directional arrow R in FIG. 6) acting on on the tool bit 20 itself are directed transversely with respect to the longitudinal axis of the bit. The force on the tool bit 20 due to the rotation of the work piece W in the direction shown by the directional arrow H (see FIGS. 4 and 5) causes forces on the tool bit 20 which would be downward in the configuration shown in FIG. 5 and FIG. 6 (most particularly directional arrow T therein). By virtue of the shape and juxtaposition of the cutting section 22 and the clamping section 24, these cutting forces are directed toward the clamping section which is firmly supported from beneath by the tool bit holder 40. Further, the support of the lower bearing surface by the tool bit holder greatly increases the strength of the tool bit in combination with the tool bit holder as the resolution of the forces on the edge 37 are substantially perpendicular to surface 32 and groove 47 (see directional arrow R in FIG. 6).

Among the advantages which accrue from the tool bit 20 of the present invention is that a single tool bit can be used for cutting in either direction. For example, while a right hand tool bit holder 40 has been illustrated in FIGS. 4 through 6, the tool bit 20 of the present invention is usable with a left-hand tool holder (not shown) by merely reversing the tool bit and grinding the proper side and end clearances on that end. The advantages noted above with regard to the tool bit still apply, i.e., only small amounts of the tool bit need be removed when sharpening the tool bit and there is no need to regrind side rake after each sharpening. Also, a single tool bit may be economically ground for right and left hand operations.

As will be readily apparent to those skilled in the art, the invention may be used in other forms without departing from its spirit or essential characteristics. The present embodiments are, therefore, to be considered as illustrative and not restrictive, the scope of the invention being indicated by the claims rather than by the foregoing description, and all changes which come within the meaning and range of equivalence of the claims are therefore intended to be embraced therein.

I claim:

1. A tool bit and tool bit holder combination, said tool bit comprising a longitudinally extending cutting section having a lower wall, a side wall and a top wall, said cutting section side wall and said cutting section top wall intersecting to form a longitudinally extending cutting edge, said tool bit further including a clamping section having a lower wall to side wall and a top wall, said cutting section and said clamping section being longitudinally cojoined thereby forming a longitudinally extending bow-tie shaped tool bit axis, a tool bit holder including a main holder body having longitudinally extending receiving means constructed and arranged for receiving said cutting section lower wall and being further constructed and arranged for receiving said clamping section lower wall and side wall, clamping means including receiving means constructed and arranged for receiving said clamping section top wall and means removably fixing said clamping means to said main holder body to removably fix said tool bit to said tool bit holder, said tool bit cutting section lower wall being generally normal with respect to said cutting edge.

2. The tool bit and tool bit holder combination according to claim 1 wherein said tool bit and tool bit holder combination is constructed and arranged in a manner that the resultant of axial advancing forces and turning force, received by said tool bit cutting section lower wall are generally normal thereto.

3. The tool bit and tool bit holder combination according to claim 2, said main holder body and each of said receiving means extending generally longitudinally, said receiving means and said clamping means being constructed and arranged for removably longitudinally fixing said tool bit to said tool bit holder.

4. The tool bit and tool bit holder combination according to claim 3, said main holder body further including a longitudinally extending shoulder, said clamping means including generally longitudinally extending arm means constructed and arranged for coacting with said shoulder thereby maintaining said clamping means longitudinally fixed relative to said main holder body.

5. The tool bit and tool bit holder combination according to claim 2, said tool bit cutting section lower wall abutting said receiving means therefor in a manner that the resultant force of axial advancing forces and turning forces received by said tool bit are transmitted substantially normally from said cutting section lower wall to said receiving means.

* * * * *